United States Patent
Ahmad et al.

(10) Patent No.: US 10,924,974 B2
(45) Date of Patent: *Feb. 16, 2021

(54) COORDINATED PACKET DATA NETWORK CHANGE FOR SELECTED INTERNET PROTOCOL TRAFFIC OFFLOAD

(71) Applicant: IDAC Holdings, Inc., Wilmington, DE (US)

(72) Inventors: Saad Ahmad, Montreal (CA); Li-Hsiang Sun, San Diego, CA (US)

(73) Assignee: IDAC HOLDINGS, INC., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/859,047

(22) Filed: Apr. 27, 2020

(65) Prior Publication Data

US 2020/0260351 A1 Aug. 13, 2020

Related U.S. Application Data

(63) Continuation of application No. 16/145,341, filed on Sep. 28, 2018, now Pat. No. 10,645,625, which is a
(Continued)

(51) Int. Cl.
*H04W 36/22* (2009.01)
*H04W 76/10* (2018.01)
(Continued)

(52) U.S. Cl.
CPC .......... *H04W 36/22* (2013.01); *H04W 36/12* (2013.01); *H04W 36/125* (2018.08);
(Continued)

(58) Field of Classification Search
CPC ..... H04W 36/22; H04W 76/02; H04W 36/12; H04W 76/068; H04W 36/0027; H04W 76/041; H04W 76/062
See application file for complete search history.

(56) References Cited

U.S. PATENT DOCUMENTS 9,693,275 B2    6/2017  Stojanovski et al.
9,930,597 B2 *  3/2018  Ahmad .............. H04W 36/125
(Continued)

FOREIGN PATENT DOCUMENTS

JP    2005244590 A    9/2005
JP    2008278078 A    11/2008
(Continued)

OTHER PUBLICATIONS

"New WID on Study on Co-ordinated P-GW change for SIPTO (FS_CSIPTO)", 3GPP Tdoc SP-130417; 3GPP TSG SA Meeting #61; Porto, Portugal, Sep. 9-11, 2013, 5 pages.
(Continued)

*Primary Examiner* — Afshawn M Towfighi
(74) *Attorney, Agent, or Firm* — Eric Berkowitz

(57) ABSTRACT

Coordinated P-GW change for SIPTO may be provided. A WTRU may send and/or receive one or more flows via a first PDN connection and via a first P-GW. The WTRU may send an indication to the network that at least one flow of the first PDN connection is available for SIPTO. The indication may include one or more SIPTO preferences. The WTRU may receive a message from a MME. The message may trigger establishment of a second PDN connection via a second P-GW. The WTRU may move, while maintaining the first PDN connection, the at least one flow from the first PDN connection to the second PDN connection. The WTRU may deactivate the first PDN connection when the one or more flows have been moved to the second PDN connection and/or when no information has been received via the first PDN connection after a predetermined duration.

14 Claims, 12 Drawing Sheets

Related U.S. Application Data continuation of application No. 15/892,964, filed on Feb. 9, 2018, now Pat. No. 10,104,591, which is a continuation of application No. 15/033,313, filed as application No. PCT/US2014/063259 on Oct. 30, 2014, now Pat. No. 9,930,597.

(60) Provisional application No. 61/897,771, filed on Oct. 30, 2013.

(51) Int. Cl.
*H04W 36/12* (2009.01)
*H04W 76/38* (2018.01)
*H04W 76/22* (2018.01)
*H04W 76/32* (2018.01)
*H04W 36/00* (2009.01)

(52) U.S. Cl.
CPC ........ *H04W 76/10* (2018.02); *H04W 36/0027* (2013.01); *H04W 76/22* (2018.02); *H04W 76/32* (2018.02); *H04W 76/38* (2018.02)

(56) References Cited

U.S. PATENT DOCUMENTS

| | | | |
|---|---|---|---|
| 10,104,591 B2* | 10/2018 | Ahmad | H04W 36/125 |
| 2010/0150011 A1 | 6/2010 | Kitaji | |
| 2012/0257598 A1 | 10/2012 | Karampatsis et al. | |
| 2012/0275310 A1 | 11/2012 | Watfa et al. | |
| 2013/0007853 A1 | 1/2013 | Gupta et al. | |
| 2013/0028172 A1 | 1/2013 | Lim et al. | |
| 2015/0146533 A1 | 5/2015 | Enomoto et al. | |
| 2016/0286451 A1 | 9/2016 | Ahmad et al. | |
| 2019/0037464 A1 | 1/2019 | Ahmad et al. | |

FOREIGN PATENT DOCUMENTS

| | | |
|---|---|---|
| JP | 2013017093 A | 1/2013 |
| JP | 2013017164 A | 1/2013 |
| JP | 2014509820 A | 4/2014 |
| WO | WO 2011098249 A2 | 8/2011 |
| WO | WO 2012135467 A1 | 10/2012 |

OTHER PUBLICATIONS

"3rd Generation Partnership Project; Technical Specification Group Services and System Aspects; 3GPP System Architecture Evolution: Report on Technical Options and Conclusions (Release 8)", 3GPP TR 23.882 V8.0.0, Sep. 2008, 234 pages.

Tarik Taleb et al., "DNS-Based Solution for Operator Control of Selected IP Traffic Offload", 2011 IEEE International Conference on Communications (ICC); Kyoto, Japan, Jun. 5-9, 2011, 5 pages.

English language abstract, Japanese Publication No. JP2005244590, Sep. 8, 2005, 1 page.

Cisco, "Selected IP Traffic Offload for LTE at S1", 3GPP Tdoc S2-100771; 3GPP TSG SA WG2 Meeting #77; Shenzhen, China, Jan. 18-22, 2010, 7 pages.

"3rd Generation Partnership Project; Technical Specification Group Services and System Aspects; Local IP access (LIPA) mobility and Selected IP Traffic Offload (SIPTO) at the local network (Release 12)", 3GPP TR 23.859 V12.0.1, Apr. 2013, 68 pages.

"3rd Generation Partnership Project; Technical Specification Group SA Study on Co-ordinated PGW change for Selected IP Traffic Offload (CSIPTO) (Release 13)", 3GPP TR 22.828 V0.1.0, Nov. 2013, 17 pages.

Qualcomm Incorporated et al., "Procedural changes to support Solution 5—Selected IP Traffic Offload solution", 3GPP Tdoc TD S2-101803; TSG SA WG2 Meeting #78; San Francisco, USA, Feb. 22-26, 2010, 9 pages.

* cited by examiner

COORDINATED PACKET DATA NETWORK CHANGE FOR SELECTED INTERNET PROTOCOL TRAFFIC OFFLOAD

CROSS REFERENCE TO RELATED APPLICATIONS

This application is a Continuation of U.S. patent application Ser. No. 16/145,341, filed Sep. 28, 2018, which is the Continuation of U.S. patent application Ser. No. 15/892,964, filed Feb. 9, 2018, which issued as U.S. Pat. No. 10,104,591 on Oct. 16, 2018, which is a Continuation of U.S. patent application Ser. No. 15/033,313, filed Apr. 29, 2062016, which issued as U.S. Pat. No. 9,930,597 on Mar. 27, 2018, which was the National Stage entry under 35 U.S.C. § 371 of Patent Cooperation Treaty Application PCT/US2014/063259, filed Oct. 30, 2014, which claims the benefit of U.S. Provisional Patent Application No. 61/897,771, filed Oct. 30, 2013, the contents of which are hereby incorporated by reference herein.

BACKGROUND

Networks that utilize small cells (e.g., Home eNodeB devices) are gaining momentum in the marketplace. Examples of small cells may include cells that are served by relatively lower power base stations, for example including relatively lower power evolved Node B (eNB) devices such as home eNBs (HeNBs), Relay Nodes (RNs), Remote Radio Heads (RRHs), and/or the like. The small cell base stations may have a relatively smaller coverage area as compared to a macro cell. Such small cells are often added to a network to increase capacity in areas with high levels of user and/or to provide additional coverage in areas not covered by the macro network—e.g., both outdoors and/or indoors. Small cells can also improve network performance and service quality by facilitating the offloading of traffic from the large macro-cells. Such heterogeneous networks with large macro-cells in combination with small cells can provide increased bitrates per unit area.

An offloading technique known as Selected IP Traffic Offload (SIPTO) may allow an operator to select a packet data network (PDN) gateway (PDN GW or P-GW) for one or more wireless transmit receive units (WTRUSs) that may take into account the location of the WTRU. The WTRU's PDN connection may be torn down and reestablished if the network realizes it may be advantageous to do so, for example, based on the location of the WTRU. Such techniques for reselecting a PDN GW that is closer to the actual location of the WTRU may facilitate more efficient routing of data within the core network, thereby more efficiently utilizing network resources. SIPTO may be used to enable local breakout of traffic from a small cell.

SIPTO may allow an operator to streamline an established PDN connection by reassigning a new P-GW that may be geographically closer to the current location of a WTRU. P-GW relocation may imply a change in IP address, and performing SIPTO may disrupt any ongoing services. It has been recommended that SIPTO should not be performed for WTRUs in a connected mode to avoid disrupting ongoing services. While this recommendation may represent an improvement compared to blindly performed SIPTO, it fails to address the issue of smooth P-GW relocation for WTRUs with long-lived and real-time IP flows, e.g. long conference calls, large file transfers, and the like.

SUMMARY

SIPTO may be performed to avoid service disruptions due to an IP address change. A WTRU may send and/or receive one or more flows via a first PDN connection. The WTRU may send an indication to the network that at least one flow of the first PDN connection is available for SIPTO. The indication may indicate one or more other flows of the first PDN connection for which SIPTO is not allowed. The first PDN connection may be via a first P-GW. The indication may include one or more SIPTO preferences. The indication may include a SIPTO allowed tag. The indication may be sent via a non-access stratum (NAS) message to a MME in the network. The indication may be sent at a bearer level, an IP flow level, and/or an application level. When the indication is sent at the application level, the indication may include an application ID indicating a SIPTO allowed status that corresponds to an application being executed at the WTRU. When the indication is sent at the bearer level, the indication may indicate one or more bearers available for SIPTO. The indication may be sent, for example, when an application being executed at the WTRU is closed or stopped. As another example, the indication may be sent when a display of a WTRU enters an idle state.

The WTRU may receive a message from the MME. The message may trigger establishment of a second PDN connection via a second P-GW. The WTRU may establish the second PDN connection via the second P-GW. The WTRU may move, while maintaining the first PDN connection, the at least one flow for which it was indicated that SIPTO was allowed from the first PDN connection to the second PDN connection. The WTRU may deactivate the first PDN connection. For example, the WTRU may deactivate the first PDN connection when the one or more flows have been moved to the second PDN connection. As another example, the WTRU may deactivate the first PDN connection when no information has been received via the first PDN connection after a predetermined duration.

A MME in the network may receive, from a WTRU, an indication that at least one flow of a first PDN connection is available for SIPTO and/or that one or more other flows may not be moved using SIPTO. The indication may include one or more SIPTO preferences and may be received at a bearer level, an IP flow level, or an application level. When the indication is received at the bearer level, the indication may indicate one or more bearers available for SIPTO. When the indication is received at the application level, the indication may include an application ID indicating a SIPTO allowed status that corresponds to a running application on the WTRU.

The MME may receive a list of applications from the WTRU. The MME may determine one or more bearers to offload based on the list of applications. The MME may determine whether to perform SIPTO for one or more flows of the first PDN connection. The MME may send a message, to the WTRU, that triggers establishment of a second PDN connection via a second P-GW. The message may include a NAS message. The message may confirm an accuracy of the list of applications. The message may be a first NAS message. The indication may be a second NAS message. The second NAS message may include a SIPTO allowed tag. The MME may perform a serving gateway (S-GW) relocation. The MME may receive, from an eNodeB, a local HeNB (LHN) identification (LHN-ID) of the second PDN connection. The MME may send the LHN-ID of the second PDN connection to the WTRU. The LHN-ID may include an IP address of a P-GW associated with the second PDN connection.

The MME may separate an access point name (APN) aggregate maximum bit-rate (APN-AMBR) into a first APN-AMBR associated with the first PDN connection and a second APN-AMBR associated with the second PDN connection. The MME may receive subscription data. The subscription data may include the APN-AMBR. The MME may determine a modified first APN-AMBR. The MME may signal the modified first APN-AMBR to an eNodeB. The MME may send a modified bearer command to a S-GW. The modified bearer command may identify the modified first APN-AMBR. The S-GW may enforce the first and second APN-AMBR.

DETAILED DESCRIPTION

A detailed description of illustrative embodiments will now be described with reference to the various Figures. Although this description provides a detailed example of possible implementations, it should be noted that the details are intended to be exemplary and in no way limit the scope of the application.

Figure 1A:
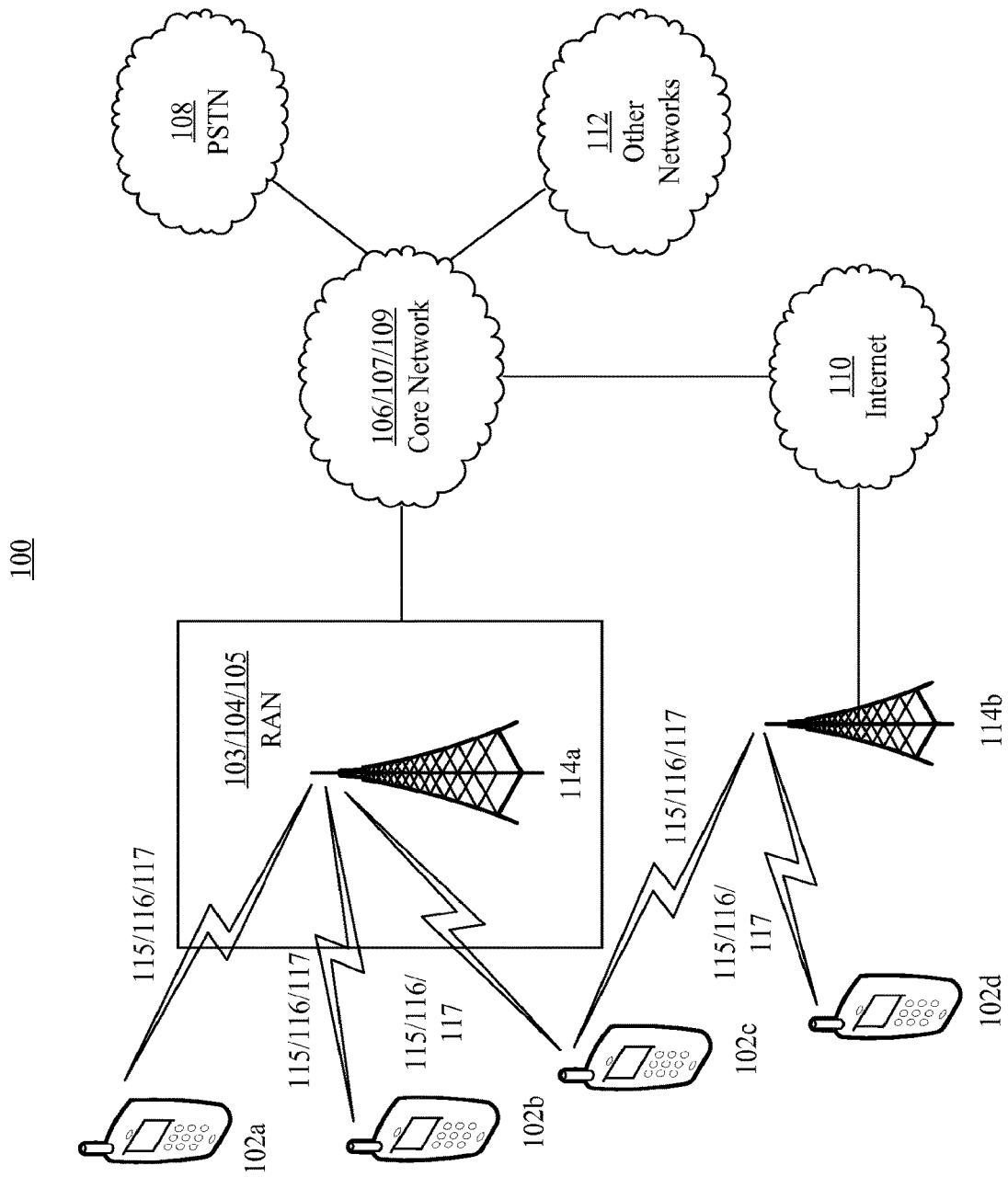
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications system 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications system 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, e.g., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 1A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

Some or all of the WTRUs 102a, 102b, 102c, 102d in the communications system 100 may include multi-mode capabilities, e.g., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
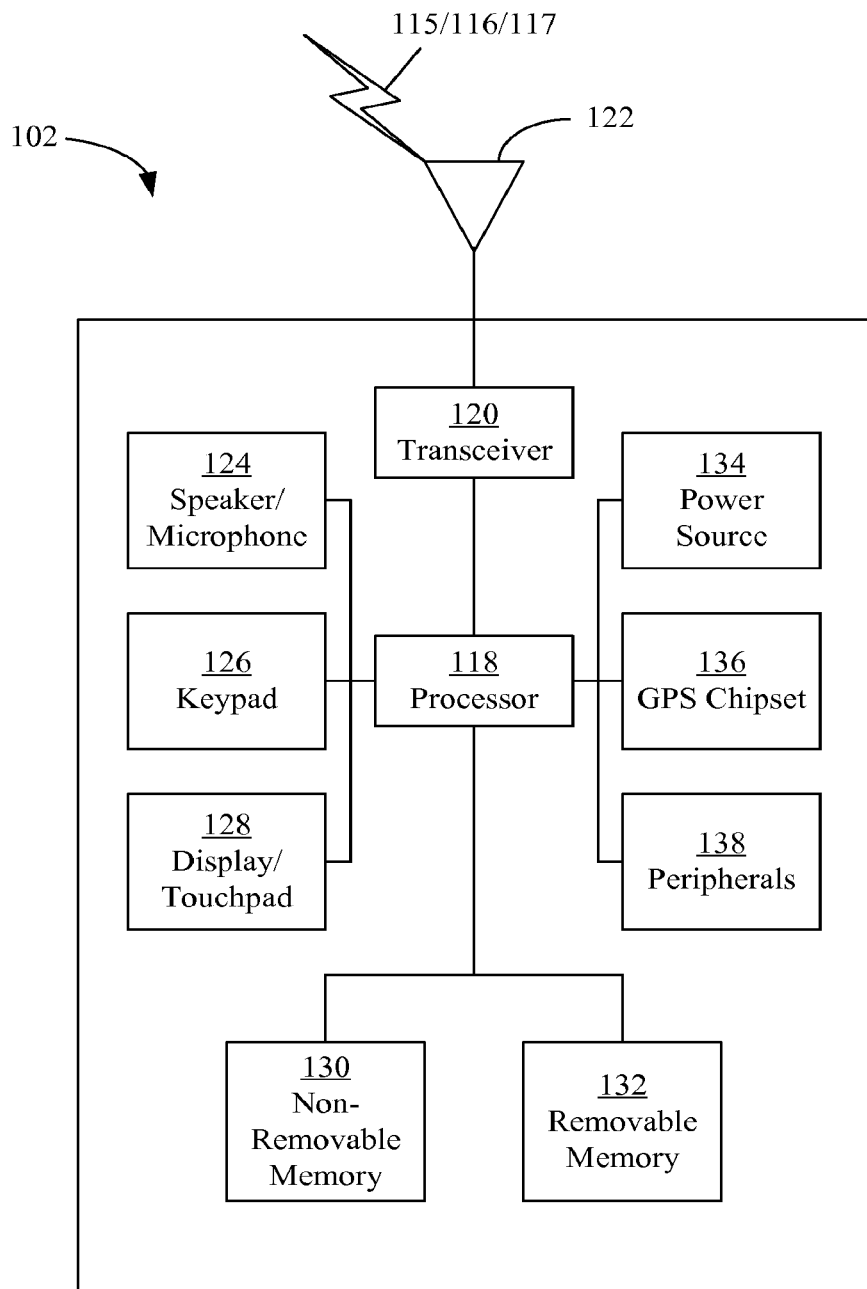
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB or HeNodeB), a home evolved node-B gateway, and proxy nodes, among others, may include some or all of the elements depicted in FIG. 1B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination implementation while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 1C:
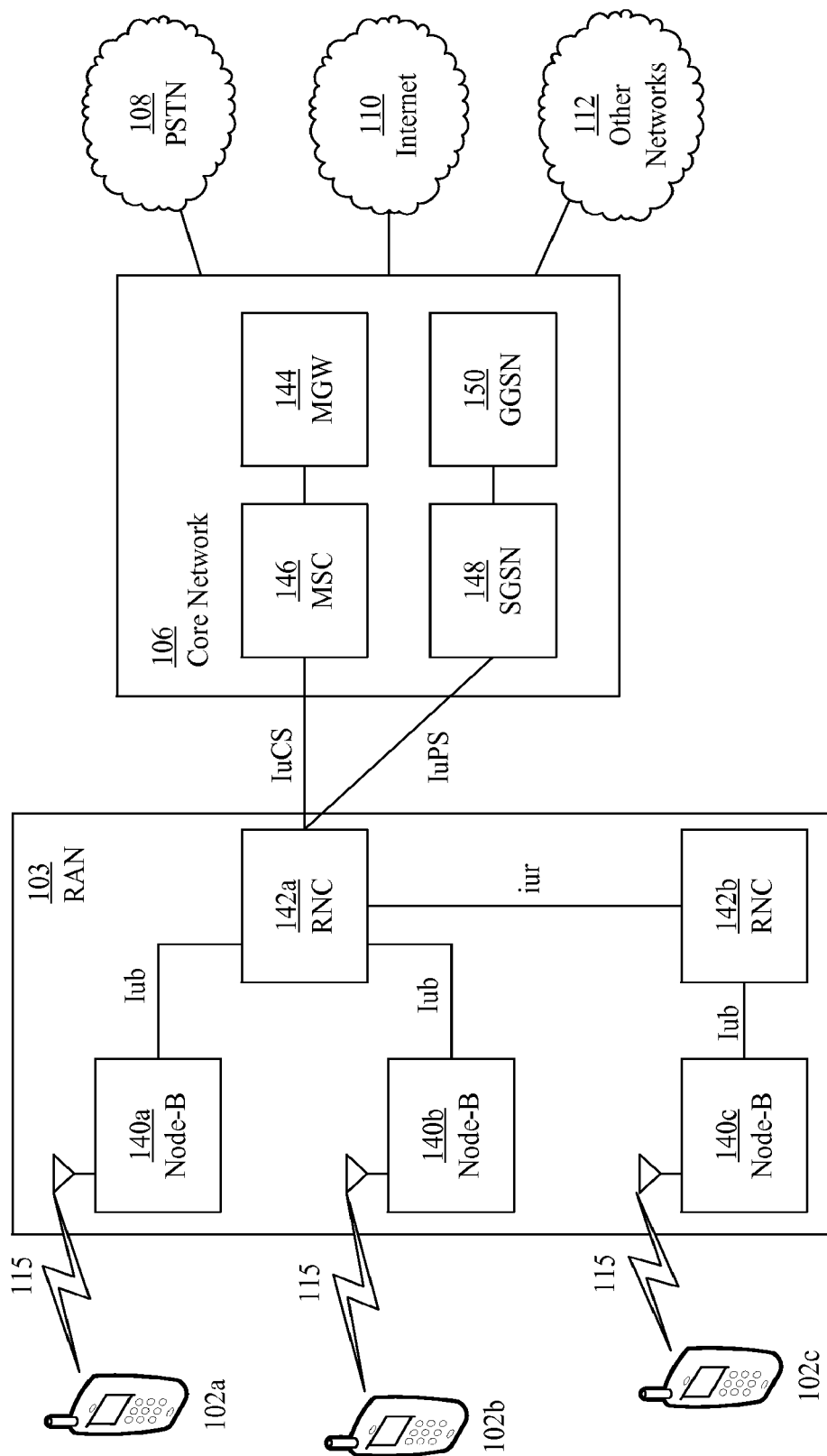
FIG. 1C is a system diagram of an example radio access network and an example core network that may be used within the communications system illustrated in FIG. 1A.

FIG. 1C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 1C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 1D:
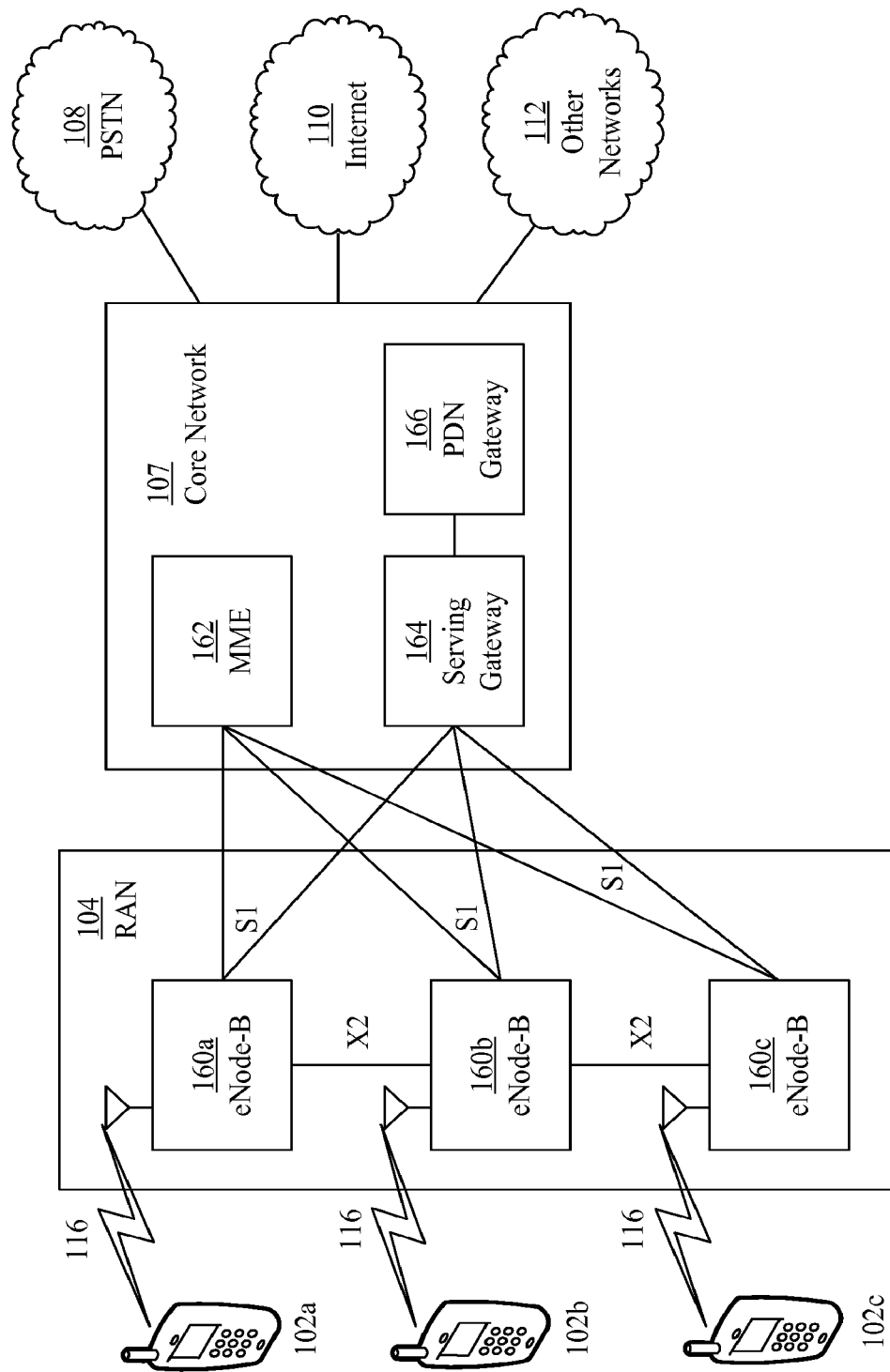
FIG. 1D is a system diagram of another example radio access network and another example core network that may be used within the communications system illustrated in FIG. 1A.

FIG. 1D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 1D, the eNode-Bs 160a, 160b, 160c may communicate with one another over an X2 interface.

The core network 107 shown in FIG. 1D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the Si interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and traditional land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 1E:
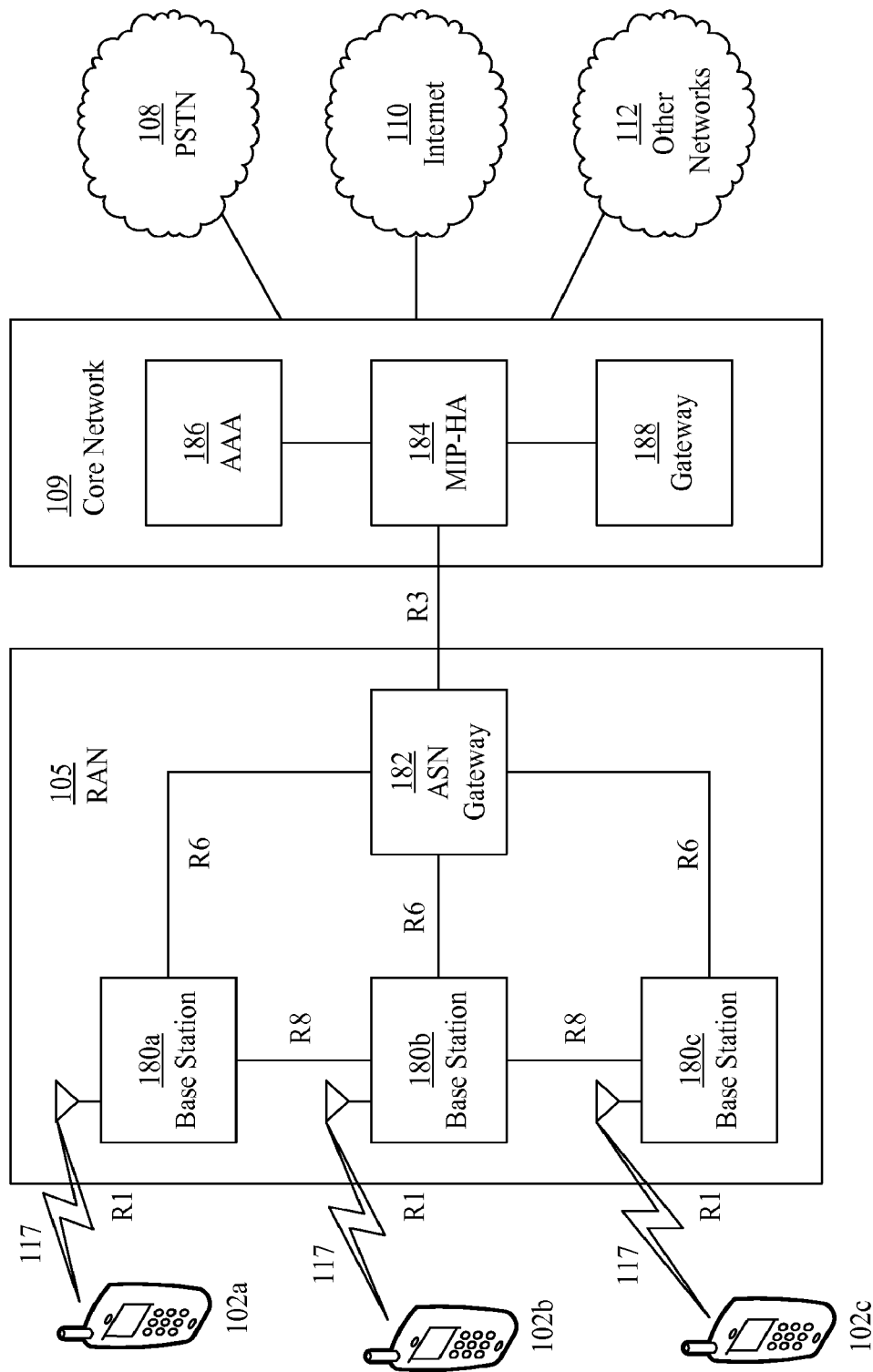
FIG. 1E is a system diagram of another example radio access network and another example core network that may be used within the communications system illustrated in FIG. 1A.

FIG. 1E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 1E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, IP host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 1E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and traditional land-line communications devices. In addition, the gateway 188 may provide the WTRUs 102a, 102b, 102c with access to the networks 112, which may include other wired or wireless networks that are owned and/or operated by other service providers.

Although not shown in FIG. 1E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

With SIPTO at a Local Network (SIPTO@LN), a P-GW (e.g., alias Local Gateway) may be relocated (e.g., moved even further) toward a network edge and may be collocated with an eNodeB. SIPTO@LN may lead to a relatively flat architecture (e.g., IP traffic can be broken out close to the network edge). With SIPTO@LN, frequency of service disruption due to SIPTO may increase (e.g., due to smaller coverage of the Local Gateway).

Service disruption due to an IP address change may include one or more effects on short-lived and/or long-lived/real-time flows. For example, for short-lived flows (e.g., web browsing) the service disruption due to a SIPTO-induced IP address change may be relatively mild. In some case, a user executing a relatively short-lived flow may not notice anything when SIPTO is performed within the network. In some examples, although the short-lived flow user may notice a slight disruption, the service disruption may be slight. For example, the user may interact (e.g., briefly interact) with a user interface, for example, by selecting a web page link after a "network connection lost" error, selecting a refresh icon, and/or the like. However, for long-lived and real-time flows, the effect of service disruption due to SIPTO may be detrimental. For example, a user may be ejected from a conference call and may have to redial a bridge number, enter a password, etc. VPN traffic may be similarly detrimentally affected by service disruption due to IP address change caused by SIPTO.

The WTRU may be able to identify a presence of long-lived and/or real-time flows. For example, the WTRU may inspect the flows that have been established to identify which flows are relatively short lived flows and which a relatively long lived flows. The WTRU may identify the short lived flows as flows that will result in minimal service disruption for the user if SIPTO is performed for the flow. The WTRU may identify the long lived flows as flows that will result in a relatively large service disruption for the user if SIPTO is performed for the flow. The WTRU may advise the network as to whether SIPTO may be performed (e.g., without much or any disruption), based on the presence of long-lived and/or real-time flows, for example on a per-flow basis.

In order to avoid service disruptions for long-lived flows, the WTRU may be configured to proactively create a new PDN connection for a long lived flow prior to breaking down the existing PDN connection for the long lived flow. Once the new PDN connection is established, the WTRU may remove the old PDN connection for the flow. As a result of creating the new PDN connection prior to breaking down the old PDN connection, the WTRU may ensure that the service disruption due the SIPTO/PDN GW change is minimized for long lived and/or real-time flows. For non-long lived flows and/or non-real-time flows (e.g., short lived flows such as those associated with internet browsing, a chat sessions, etc.), the WTRU may indicate to the network that SIPTO/PDN GW change can be performed without setting up the new connection prior to moving the old connection. The WTRU may support one or more flows via a first IP address with a first PDN connection. For supporting applications, the WTRU may proactively move one or more long-lived and/or real-time flows from the first IP address (e.g., an existing IP address) to a second IP address (e.g., a new IP address). The second IP address may include a new PDN connection. The WTRU may move the one or more long-lived and/or real-time flows to the second IP address via a second PDN connection before the first IP address (e.g., first PDN connection) is removed. For example, a multimedia telephony service (MMTel) set of applications and/or other applications may be capable of proactively moving one or more long-lived and/or real-time flows as described herein. An IMS application may allow a change of media transport addresses for an ongoing session using IMS service continuity mechanisms.

A network may consider an end-user's expectation regarding local P-GW change in case of SIPTO use. For example, the network may consider the end-user's expectation based on one or more end-user preferences, to benefit from the WTRU's knowledge of the flow type of an established IP flow, and/or the like.

A WTRU may send one or more preferences to the network. The WTRU may send the one or more preferences to the network to ensure that a seamless handover takes place when moving flows from non-SIPTO to SIPTO PDN connections and vice versa. Various network nodes, such as HSS (e.g., including subscription parameters), MME, and/or WTRU may take actions to ensure the seamless handover. As an example, the preference information may indicate whether for a given flow a new PDN connection associated with a new P-GW is to be established prior to deactivating the an old PDN connection associated with a previous P-GW when performing SIPTO for the flow (e.g., for a long-lived and/or real-time flow). The preference information for another flow may indicate that the flow can be moved to a new PDN connection associated with a new P-GW without having to set up the new PDN connection in advance (e.g., for short-lived and/or non-real-time/best effort flows). Thus, a make-before-break scheme for the PDN connection may be used for performing SIPTO for long-lived and/or real-time flows, and short lived and/or non-real-time flows may be associated with a SIPTO scheme where the old PDN connection is deactivated at substantially the same time as the new PDN connection is activated (e.g., a break while make or break before make scheme).

There may be a conflict between a network wanting to offload certain flows or PDN connections to SIPTO@LN and a WTRU wanting to keep an original PDN connection, for example, for service continuity or other reasons. The network and/or WTRU may handle or resolve the conflict.

A 3GPP network may use one or more subscription parameters (e.g., subscription information) to determine whether a WTRU supports WTRU-assisted SIPTO and/or coordinated change of P-GW. The one or more subscription parameters may be used because one or more WTRUs in a system may not support WTRU-assisted SIPTO and/or coordinated change of P-GW. The one or more subscription parameters may be used because one or more WTRUs in the system may not subscribe to WTRU-assisted SIPTO and/or coordinated change of P-GW when signing up with an operator. The one or more subscription parameters may specify whether the user's or WTRU's input is used to decide whether the traffic is subject to offloading between 3GPP and non-3GPP access.

The subscription information may specify what type of traffic may be subject to offloading. For example, traffic with a specific quality of service (QoS) or QoS class identifier (QCI), application type, APN, subscriber profile ID (SPID), and/or the like may be subject to offloading. As another example, all traffic except voice traffic may be subject to offloading. As another example, voice calls except for emergency voice calls may be subject to offloading. The subscription information may specify which bearers, IP flows, and/or PDN may be subject to offloading. The subscription information may specify that background traffic may be subject to offloading. The subscription information may specify that a default bearer (e.g., only the default bearer) is subject to offloading. The subscription information may specify that one or more dedicated bearers (e.g., only the dedicated bearers) are subject to offloading.

The subscription information may specify whether the network may consider (e.g., may always have to take into consideration) an indication and/or an assistance information sent by the WTRU for a coordinated P-GW change. The subscription information may specify whether offloading may be applicable to a particular cell, e.g., a CSG cell, or a local network with a specific local network identity, or a tracking area, etc. The subscription information may specify a list of applications and/or application IDs. The list of applications and/or application IDs may include applications that may benefit from a seamless transition to a local network and/or applications that may use input from a user or WTRU or a preference about whether the bearer containing such application data may be moved to SIPTO@LN.

Upon registration to the network, a HSS may provide subscription information to a MME and/or a node that is fetching the WTRU's subscription information (e.g., SGSN, MSC, etc.). The MME (e.g., or a node with similar functionality, such as the SGSN) may send the subscription information to one or more core network nodes, such as the Serving Gateway (S-GW) and/or the Packet Data Network (PDN) Gateway (PDN GW or P-GW).

The subscription information may be forwarded from a first MME to a second MME during an inter-MME handover. The source may include the subscription information as part of the transferred WTRU context. The source MME/SGSN may include the subscription information when handing over to another system node such as an SGSN/MME, respectively.

The subscription information may be provided to the WTRU, for example, via OMA DM, ANDSF, SMS, etc. The WTRU may provide the subscription information to the eNB. The eNB may use the subscription information to determine whether to offload traffic. The eNB may determine whether to offload traffic based on the subscription information and/or a WTRU preference.

A WTRU may provide capability information to a network and/or a MME. The WTRU may provide the capability information to the network and/or the MME via a capability information element (IE). The capability IE may inform the MME that the WTRU may be able to send or capable of sending one or more flow preferences to decide which flows, bearers, and/or PDN connections may be offloaded to SIPTO@LN. The MME may use the capability information received from a HSS and/or the capability IE to determine whether to perform network imitated SIPTO and/or WTRU-assisted SIPTO offload.

When a WTRU enters a local network or a cell or in coverage of an eNB or a HeNB where SIPTO offload may be possible, the WTRU may be aware that the local network, the cell, and/or the eNB supports SIPTO offload. The WTRU may determine whether to send one or more preferences to the local network, the cell, and/or the eNB. The one or more preferences may include one or more SIPTO preferences. The WTRU may send the one or more preferences via an indication. The one or more preferences and/or the indication that may be sent to the network are disclosed herein. The one or more preferences may be sent to the MME via a NAS message (e.g., a NAS message that may be defined for the purpose of sending one or more SIPTO preferences to the MME).

The WTRU may be aware of whether an eNB or a cell supports SIPTO or is connected to an L-GW. When the WTRU determines that the eNB or the cell supports SIPTO or determines that the eNB or the cell is connected to a L-GW, the network or the MME may send a message to the WTRU. The message may indicate that one or more flows of the WTRU's traffic may be subject to SIPTO@LN and/or SIPTO offloading. The WTRU may send one or more preferences (e.g., SIPTO preferences) about one or more flows and/or an application that it wants to be offloaded to the SIPTO@LN PDN connection.

The WTRU may send preference information to the MME (e.g., for coordinated P-GW change for SIPTO). The preference information may include an indication that at least one flow is available for SIPTO. The preference information may include one or more of the following. The WTRU may send a tag or an IE that indicates whether SIPTO is allowed or disallowed on one or more PDN connections (e.g., that the WTRU may have at a given time when it moves to the local network). For example, if the WTRU has two PDN connections (e.g., a first PDN connection and a second PDN connection) and the WTRU only wants one of the two PDN connections to be offloaded, the WTRU may tag one of the two PDN connections as SIPTO allowed and may tag the other PDN connection as SIPTO not allowed. The WTRU may indicate that the at least one flow available for SIPTO is on the first PDN connection. The tag may be sent via a NAS message to the MME. The NAS message may be sent to the MME that corresponds to an IP address and/or an identity of one or more PDN connections that the WTRU may have at a given time.

The WTRU may send preference information at a finer granularity than a flow. For example, the preference information may be sent at the bearer level, at the IP flow level, and/or at the application level. When the preference information is sent at the bearer level, the WTRU may specify a bearer that can be offloaded to the local network. When the preference information is sent at the IP flow level, the WTRU may specify an IP flow or flows that can be offloaded to the local network. When the preference information is sent at the application level, the WTRU may send one or more application IDs to the MME with a corresponding SIPTO status (e.g., SIPTO allowed or SIPTO disallowed) for each application running on the WTRU.

The MME may send an indication that a PDN connection is subject offloading. When the MME indicates that the PDN connection is subject to offloading, the WTRU may send (e.g., respond with) an indication that it does not want to offload and/or may inform the network when it is ready to offload. For example, the WTRU may send the indication that it does not want to offload, when a WTRU has ongoing traffic that it does not want to disrupt, such as a voice call or a video chat. When the ongoing data session is finished, the WTRU may send an indication that it is ready for SIPTO offload and/or that the network can proceed with SIPTO.

A WTRU may reject a network request for SIPTO. The WTRU may reject the network request for SIPTO, when a user or the WTRU knows that the SIPTO offload may affect a quality of service and/or a quality of experience for the user.

When the WTRU is in the local network and/or under the coverage of an eNB that supports SIPTO, the WTRU may send an indication to start the SIPTO offload at a next time when the WTRU goes from connected to idle. When the network receives the indication, the network may offload one or more flows to SIPTO@LN when the WTRU moves to idle mode.

The WTRU may send the indication to the network that it may start the SIPTO offload based on one or more of the following triggers. For example, the WTRU may send the indication when the WTRU closes a certain application. The WTRU may not want to perform SIPTO when a certain application is running on the WTRU. The WTRU may send the indication (e.g., a start SIPTO indication) when the certain application is closed down. When an application is started and the WTRU is in an area where SIPTO is supported, the WTRU may send an indication to the network to start SIPTO offload. The WTRU may also send the indication to start SIPTO offload when a display screen of the WTRU (e.g., smartphone screen) goes to rest (e.g., when the WTRU locks or the screen goes blank because of inactivity). There may be an interaction between the operating system of the phone and the 3GPP protocol stack such that when the screen goes blank, the 3GPP protocol stack may be notified, which in turn may send the indication to the MME, via a NAS message, that one or more flows are ready for SIPTO offload.

When the WTRU sends preference information for the coordinated P-GW change for SIPTO to the network (e.g., MME), the MME may determine to offload some or all of its traffic to the local network via SIPTO offload based on the preference information. The MME may take one or more actions to ensure a seamless SIPTO handover. For example, the MME may decide not to offload traffic to SIPTO based on the WTRU preference information. The WTRU may retain an existing (e.g., the original) PDN connection and/or bearer through the macro network PDN-GW.

When a MME receives an application ID, a flow identification, and/or other information about a flow be capable of SIPTO offloading, the MME may determine to offload the SIPTO capable flow based on the WTRU preference information. For example, one or more SIPTO capable flows may be on one or more PDN connections and/or one or more bearers. The MME may move the one or more flows between one or more PDN connections. The MME may move the one or more flows, by establishing a SIPTO@LN PDN connection or sending a message asking the WTRU to establish (e.g., initiate) a SIPTO@LN PDN connection for a flow (e.g., every flow) moved to a local PDN-GW. For example, if the MME wants to move two flows from different macro PDN connections, the MME may request that the WTRU establish two SIPTO@LN PDN connections. The MME may request that the WTRU and move the two flows (e.g., SIPTO capable flows) to the two PDN connections (e.g., if different flows belong to PDN connections for different APNs). The MME may request the WTRU to establish only one SIPTO@LN and move the SIPTO capable flows to that local network PDN connection (e.g., if the flows from different PDN connections belong to the same APN or in some other scenarios). The MME may send or install one or more traffic filters to change the direction of one or more flows from a macro network PDN connection to a SIPTO@LN. The one or more traffic filters may include one or more Traffic Flow Templates (TFTs) and/or one or more Packet Filters (PF). The one or more traffic filters may direct the SIPTO capable traffic from the WTRU to the L-GW in the local network.

The WTRU may send a list of applications to the MME while it is attached to the system. When the MME is about to perform SIPTO, The MME may confirm with the WTRU whether the WTRU is running the same applications in the list of applications. The MME may send a NAS message to the WTRU to check what applications are running. The MME may determine which bearers to offload and/or whether to perform the SIPTO offload based on the applications running on the WTRU.

When the WTRU moves into a local network, the MME may know that a SIPTO@LN offload may not be possible because when the WTRU moved into the local network, the MME may have performed a S-GW relocation without mobility to the S-GW in the local network. The S-GW in the local network may be collocated with L-GW. One or more of the WTRU's PDN connections and/or EPS bearers may go through the S-GW in the local network. The one or more PDN connections and/or EPS bearers may go through the S-GW in the local network to prepare for when the WTRU is ready to perform SIPTO offload as the SIPTO PDN connection may go through the S-GW in the local network.

A WTRU may proactively move one or more flows (e.g., long-lived and/or real-time flows) from a first IP address to a second IP address (e.g., on a new PDN connection) before the first IP address (e.g., old PDN connection) may be removed. For example, a WTRU with an IMS session may continue to receive or transmit voice or video media with the first IP address while it is setting up a second IP address via a second PDN connection and/or performing SIP re-invitation to the second IP address. The WTRU may (e.g., simultaneously) have multiple PDN connections of the same APN, but to different PGWs (e.g., to continue to receive or transmit voice or video media with the first IP address while setting up the second IP address).

Figure 2:
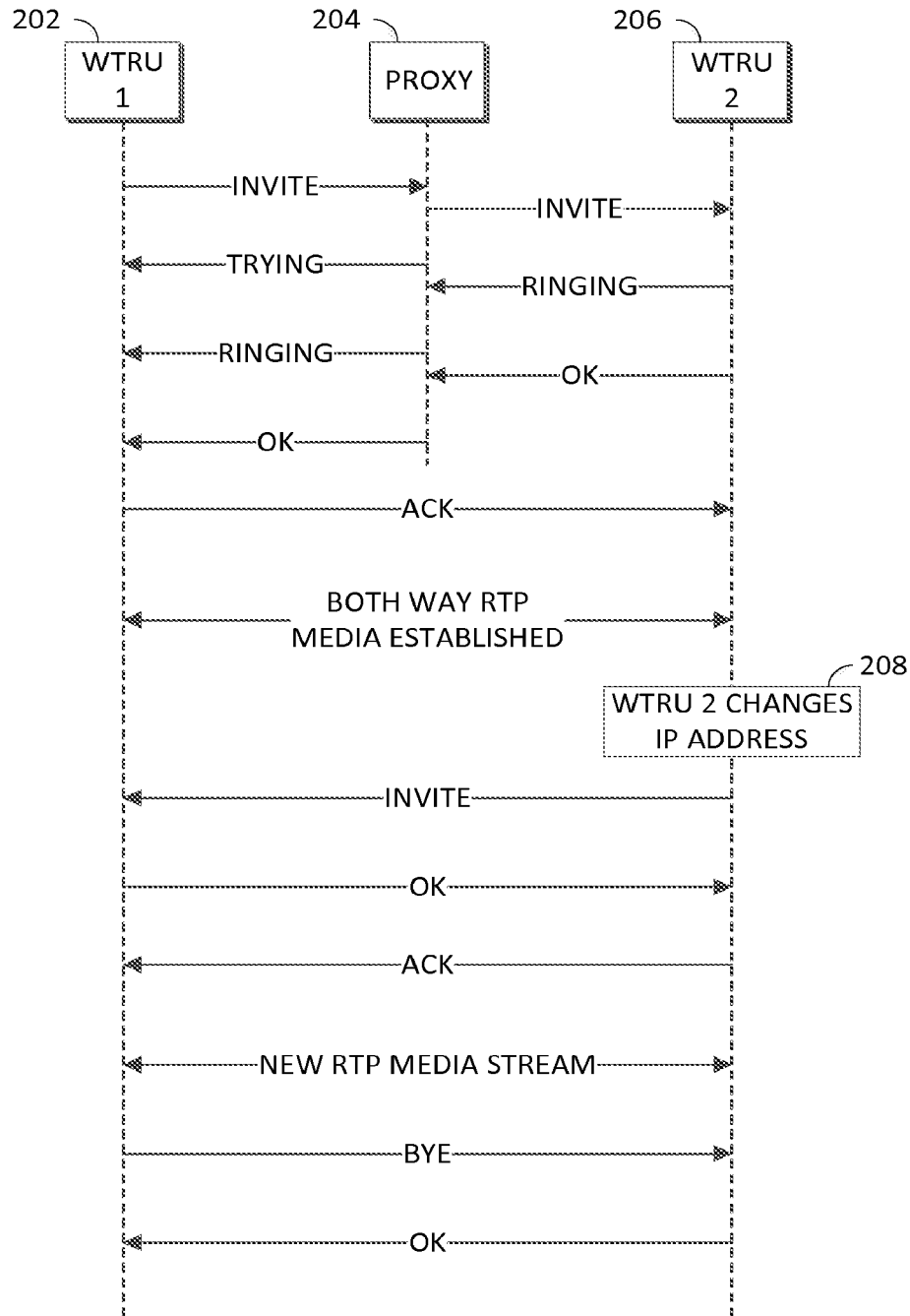
FIG. 2 illustrates an example call flow for a SIP session with re-invite.

FIG. 2 illustrates an example call flow 200 for a SIP session with re-invite. A first WTRU 202 may establish a connection with (e.g., invite) a second WTRU 206. The connection may be established through a proxy 204. At some point during the connection, the second WTRU 206 may change an IP address 208. The change in IP address 208 interrupts (e.g., breaks) the connection between the first WTRU 202 and the second WTRU 206. The second WTRU 206 must re-establish the connection with (e.g., re-invite) the first WTRU 202.

A WTRU may be triggered to establish (e.g., create) a PDN connection for SIPTO via a NAS message. The NAS message may include a PDN deactivation message with ESM cause "reactivation requested." Establishing a PDN connection in response to a PDN deactivation message may be described as break-before-make in nature. A trigger (e.g., from the network) may be used to inform the WTRU to perform a PDN connectivity request without deactivating the existing PDN connection. For example, a message may be sent from the MME to the WTRU for establishing a PDN connection of a given APN. The message may be sent via a NAS ESM message. The WTRU may send an indication, to the MME, that at least one flow of a first PDN connection is available for SIPTO. The MME may send the message after receiving the indication from the WTRU that the at least one flow of the first PDN connection is available for SIPTO and the network decides to perform SIPTO. The message may be triggered by WTRU mobility. For example, the message may be sent when the WTRU moves out of a first LHN area to a second LHN area.

When the WTRU has moved the traffic from a first PDN connection to a second PDN connection, if the WTRU has not received any packets from the first PDN connection for a period of time, it may request the deactivation of the first PDN connection.

Figure 3:
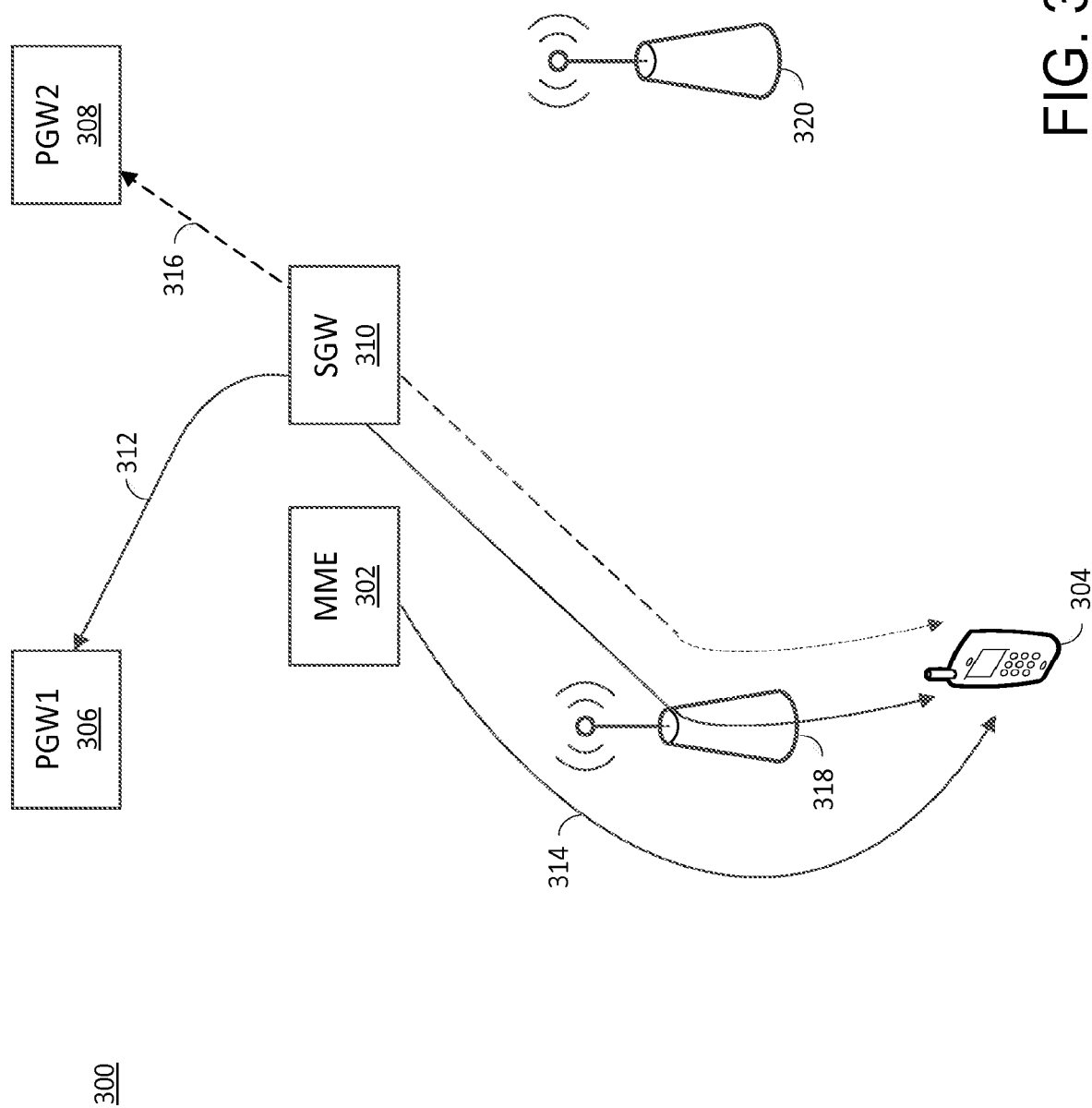
FIGS. 3 and 4 illustrate an example network employing a make-before-break SIPTO PDN connection.
Figure 4:
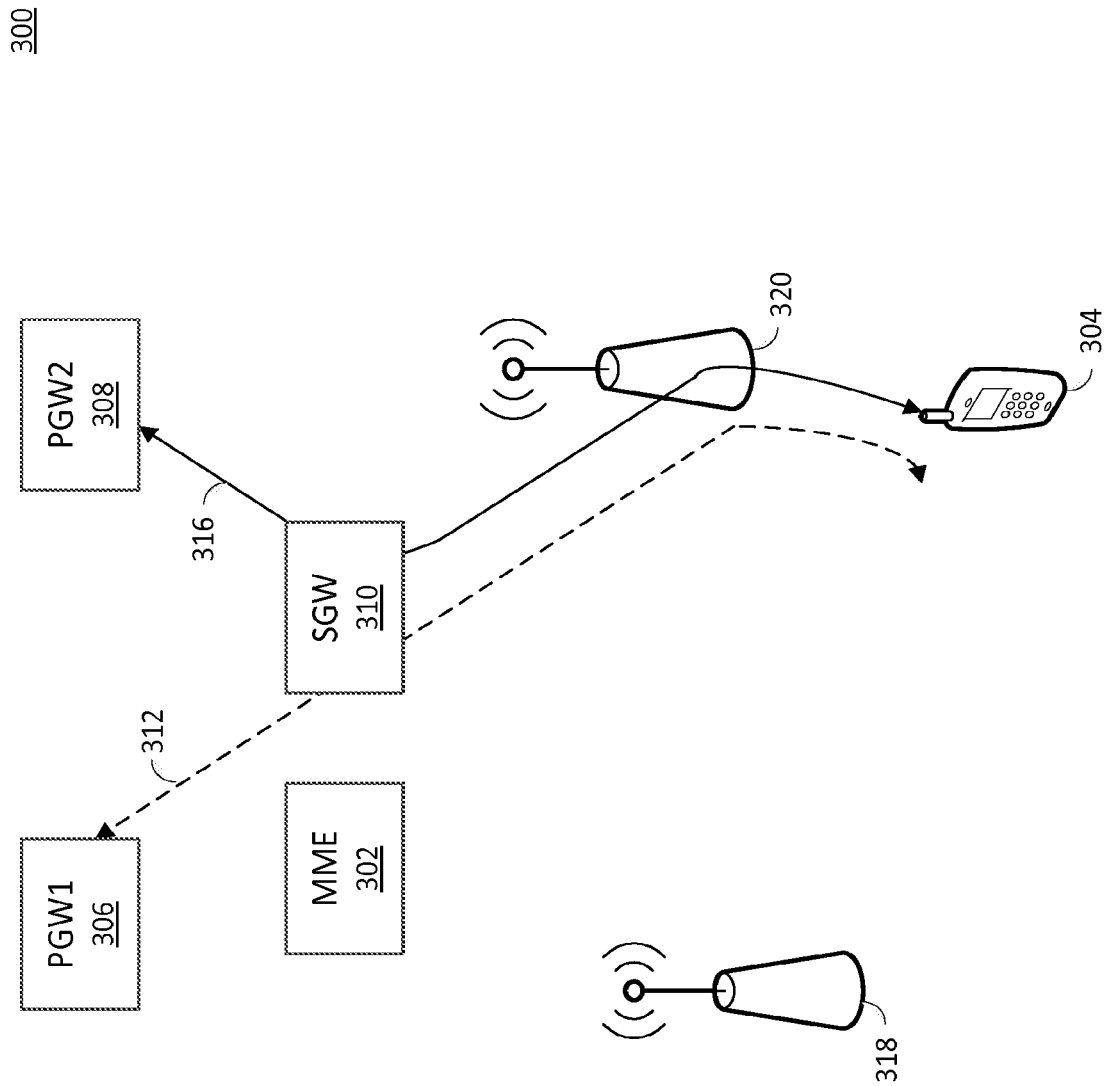

FIGS. 3 and 4 illustrate an example network 300 employing a make-before-break SIPTO PDN connection. As shown in FIG. 3, a WTRU 304 may have a first PDN connection 312 (e.g., an existing PDN connection) with a first P-GW 306. The first PDN connection 312 may be via a first L-GW or a first eNodeB 318 and a S-GW 310. One or more flows may be sent via the first PDN connection 312. An MME 302 may send a message 314 to the WTRU 304. The message 314 may trigger the WTRU to establish (e.g., to create) a second PDN connection 316 (e.g., a new PDN connection) with a second P-GW 308. The WTRU 304 may establish the second PDN connection 316. The WTRU 304 may establish the second PDN connection 316 without deactivating the first PDN connection 312. The MME 302 may send the message 314 to the WTRU 304 based on a trigger condition disclosed herein, a load condition of the first P-GW 306 of the first PDN connection 312, and/or by a location (e.g., an anticipated location) of the WTRU 304 where a second P-GW 308 may be closer to the WTRU's point of attachment. The WTRU 304 may perform a PDN connectivity request. The MME 302 may provide the IP address of the second P-GW 308 to the S-GW 310. The WTRU 304 may move one or more flows from the first PDN connection 312 to the second PDN connection 316. The WTRU 304 may stop transmitting on the first PDN connection 312.

As shown in FIG. 4, the WTRU 304 may deactivate the first PDN connection 312 when it has completed moving one or more flows (e.g., all the existing flows) to the second PDN connection 316 and/or when no information (e.g., data) has been received via the first PDN connection 312 after a predetermined duration.

While FIGS. 3 and 4 illustrate the WTRU 304 moving from the first L-GW or first eNodeB 318 to a second L-GW or second eNodeB 320, the disclosed subject matter may also be applicable when the WTRU 304 remains connected to the first eNodeB 318 or cell.

Figure 5:
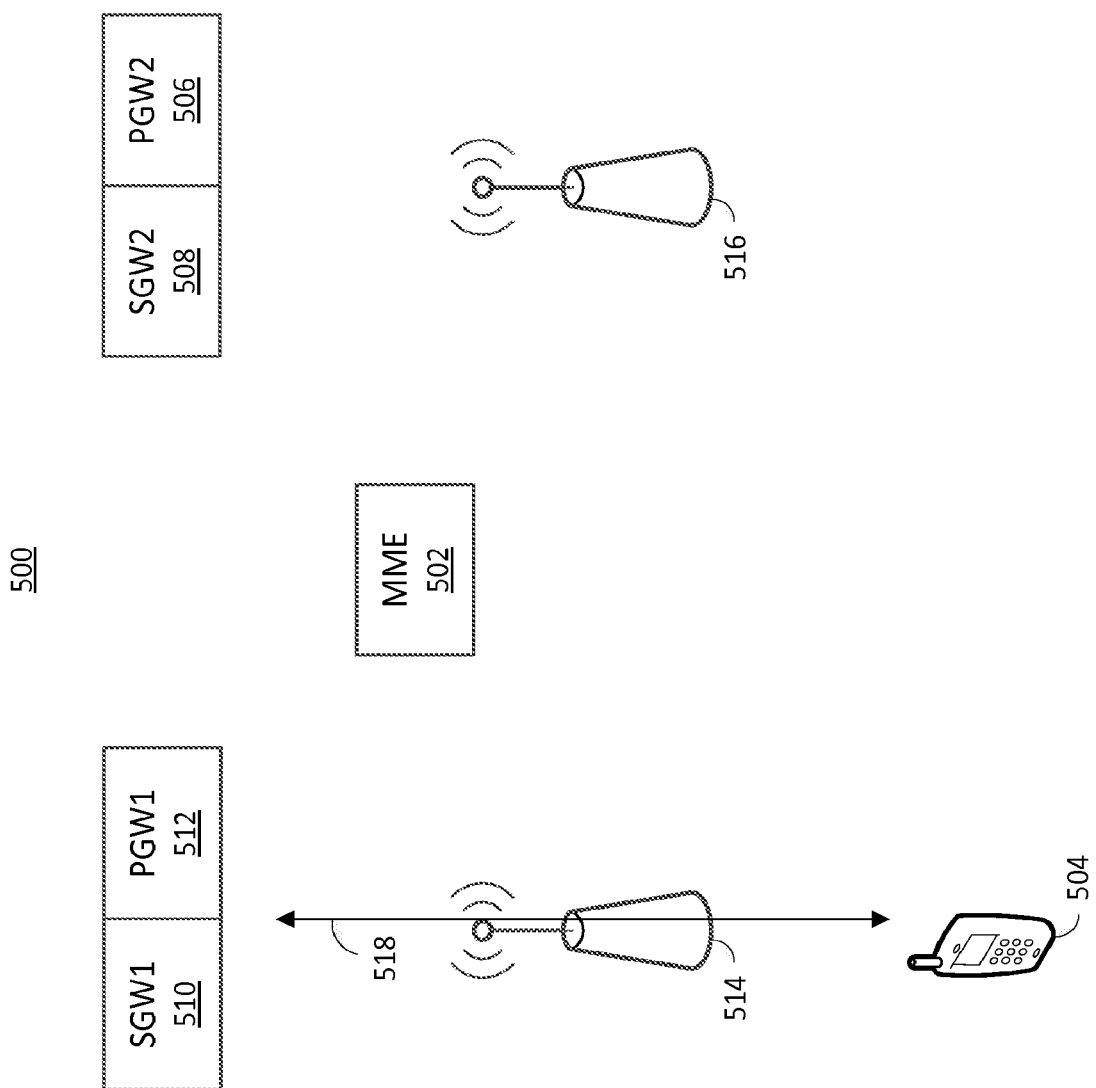
FIGS. 5 and 6 illustrate an example network employing make-before-break SIPTO for the case of SIPTO@LN with standalone LGW.
Figure 6:
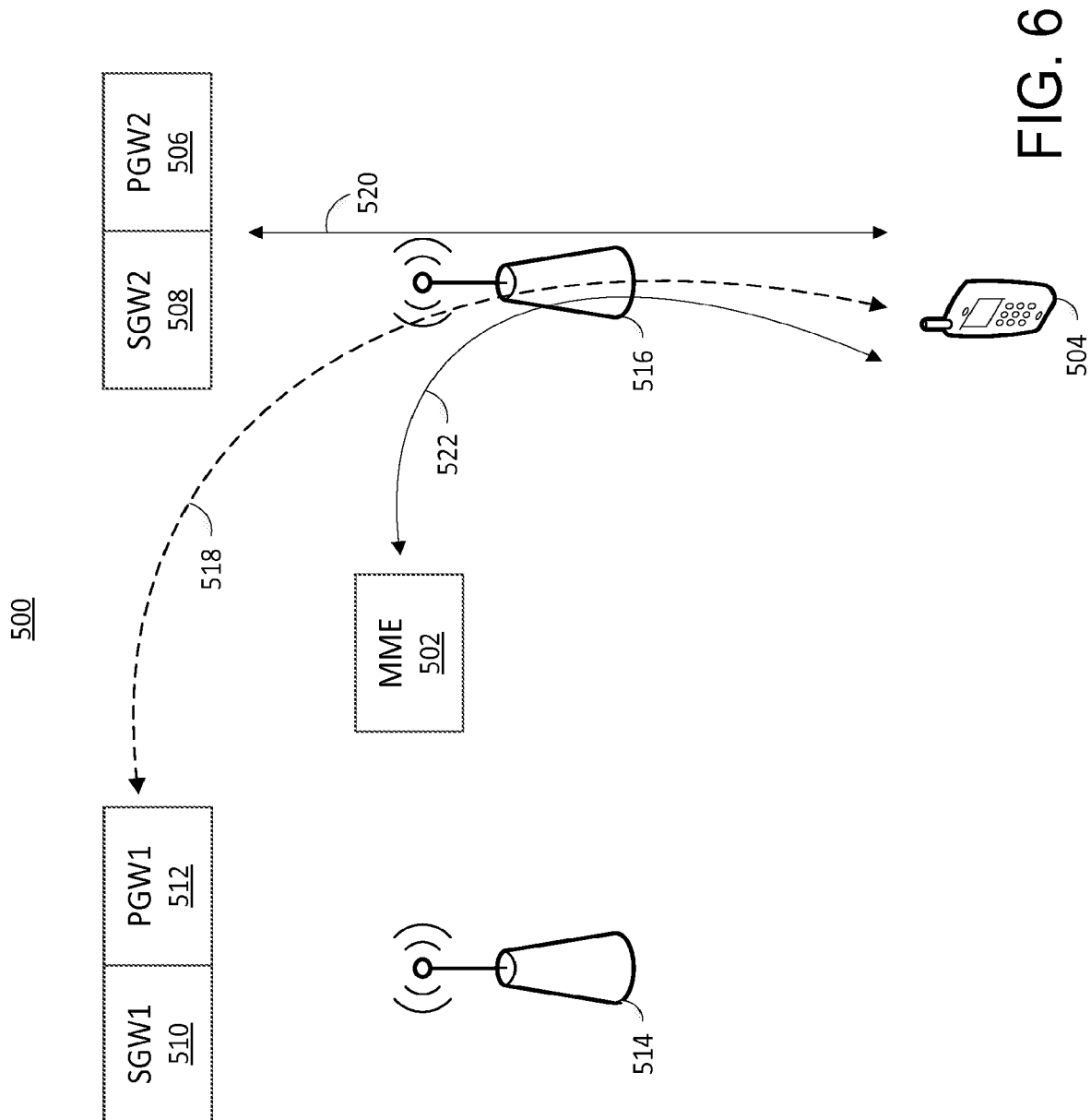

FIGS. 5 and 6 illustrate an example network 500 employing make-before-break SIPTO for the case of SIPTO@LN with a standalone L-GW. The standalone L-GW may be a first L-GW 514. SIPTO@LN may assume that a target S-GW selected during the handover may have connectivity to the first L-GW 514. SIPTO may use the connectivity to the first L-GW 514 for deactivation after a mobility event or a possible S-GW relocation. Given this assumption, deactivation of a first PDN connection 518 may be deferred until sometime after handover to a different LHN area or a macro cell.

A make-before-break SIPTO procedure in the case of SIPTO@LN may include an MME 502 sending a message 522 to a WTRU 504. The message 522 may trigger the WTRU 504 to establish (e.g., to create) a second PDN connection 520 with a second P-GW 506. The WTRU 504 may establish the second PDN connection 520 without deactivating the first PDN connection 518. For example, the message 522 may be sent by the MME 502 when the WTRU 504 moves to a different LHN area, or to a different macro cell. The WTRU 504 may perform a PDN connectivity request. The MME 502 may provide the IP address of the second P-GW 506 to a second S-GW 508. The WTRU 504 may move one or more flows from the first PDN connection 518 to the second PDN connection 520. The WTRU 504 may stop transmitting on the first PDN connection 518.

As shown in FIG. 6, the WTRU 504 may deactivate the first PDN connection 518 when it has completed moving one or more flows (e.g., all the existing flows) to the second PDN connection 520 and/or when no information (e.g., data) has been received via the first PDN connection 518 after a predetermined duration. The MME 502 may perform an MME-initiated S-GW relocation from a first S-GW 510 to a second S-GW 508, if the S-GW has not been relocated to the S-GW 508 during the mobility procedure.

The MME 502 may send the message 522 to the WTRU 504 and the WTRU 504 PDN connectivity request may be performed before the WTRU 504 moves out of a first LHN area (e.g., served by L-GW 514). For example, the MME 502 may send the message 522 if the MME 502 knows a LHN-ID for a second LHN area of which the WTRU 504 has not yet moved into. The second LH area may be associated with the second PDN connection 520. The LHN-ID may be provided by a source eNB to the MME 502. The MME may send the LHN-ID of the second PDN connection 520 to the WTRU 504. The LHN-ID may include an IP address of a P-GW associated with the second PDN connection 520.

Figure 7:
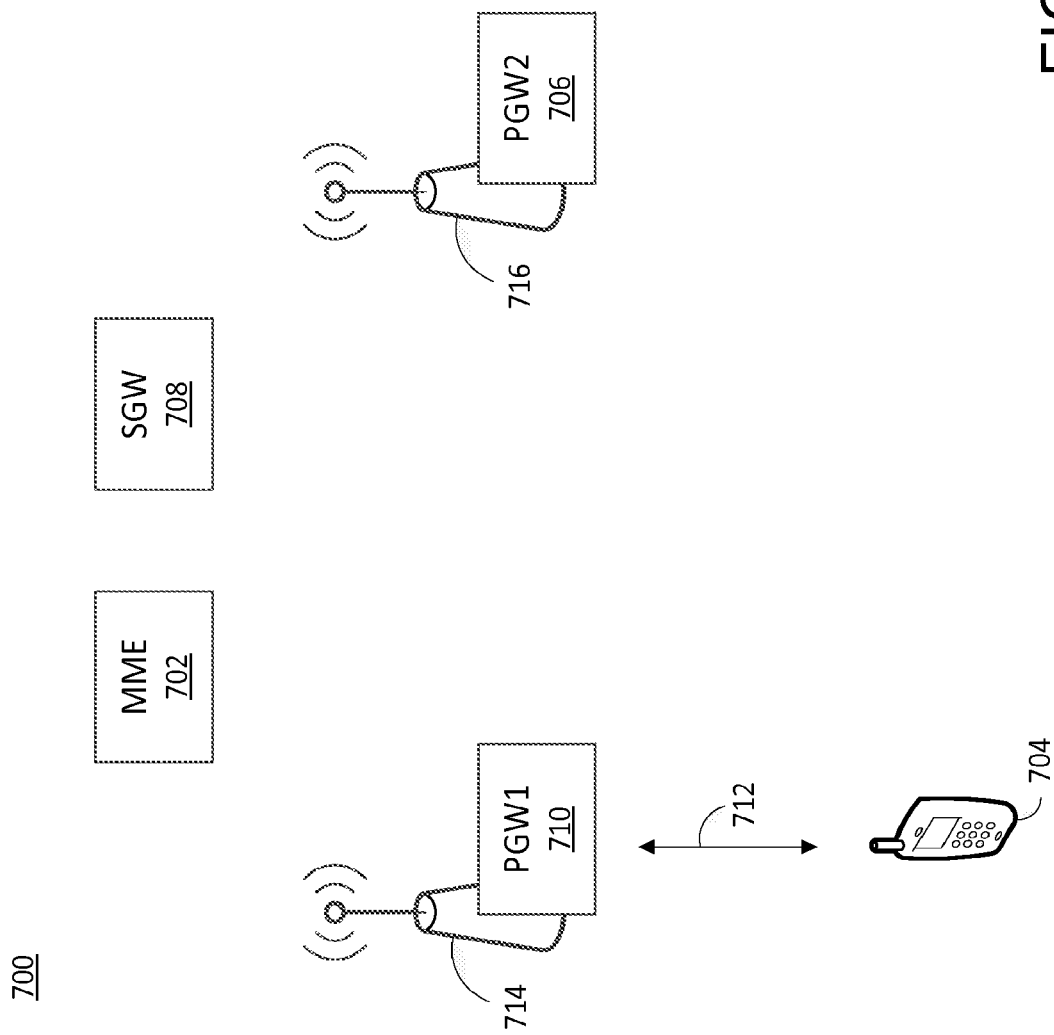
FIGS. 7 and 8 illustrate an example network employing make-before-break SIPTO for the case of SIPTO@LN with collocated LGW.
Figure 8:
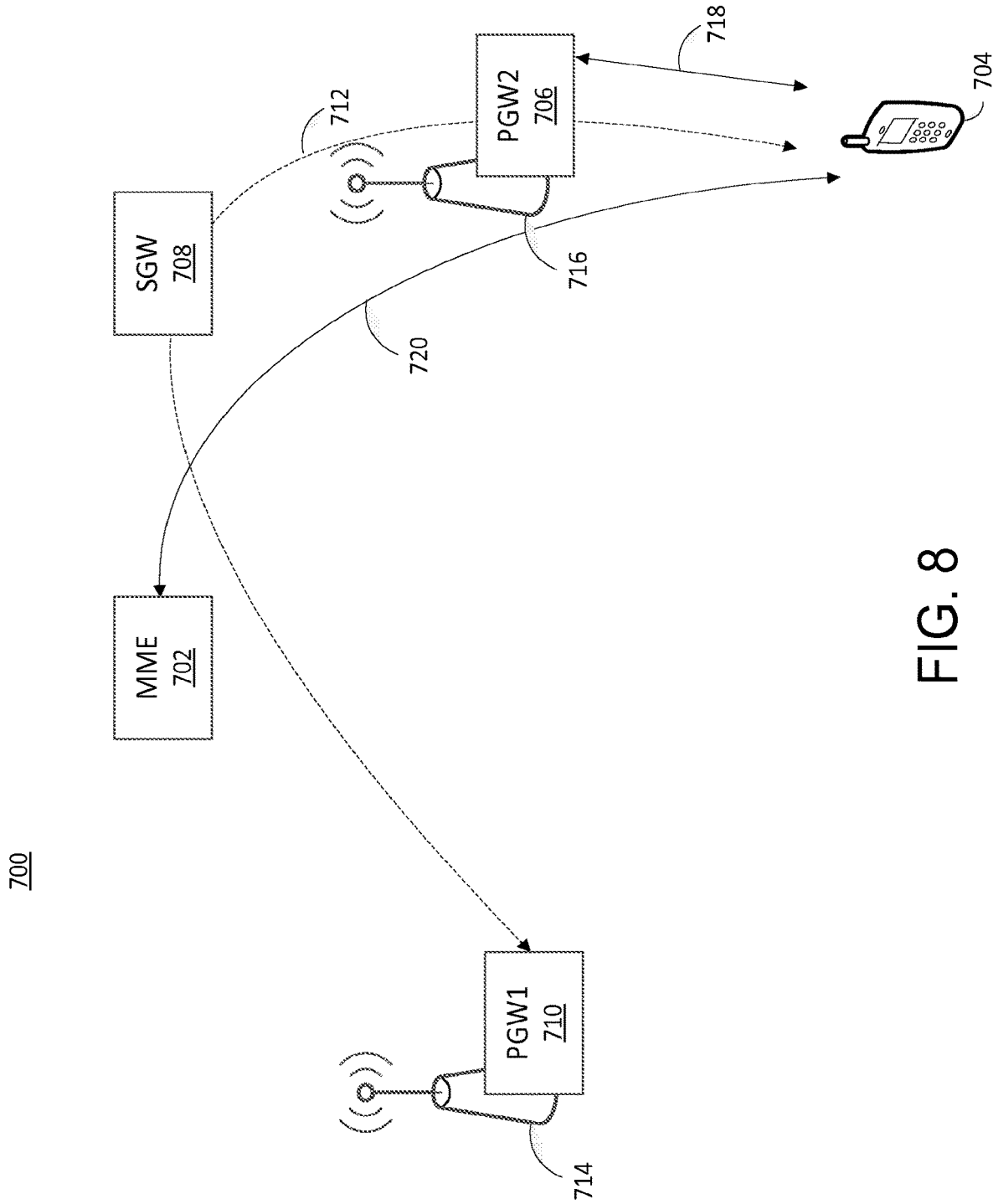

FIGS. 7 and 8 illustrate an example network 700 employing make-before-break SIPTO for the case of SIPTO@LN with a first L-GW 714 collocated with a first P-GW 710. SIPTO@LN may assume that a target S-GW 708 selected during the handover may have connectivity to the first L-GW 714. SIPTO may use the connectivity to the first L-GW 714 for deactivation after a mobility event or possible S-GW relocation. Given this assumption, deactivation of a first PDN connection 712 may be deferred until sometime after handover to a different HeNB or a macro cell.

A make-before-break SIPTO in the case of SIPTO@LN may include an MME 702 sending a message 720 to a WTRU 704. The message 720 may trigger the WTRU 704 to establish (e.g., to create) a second PDN connection 718 with a second P-GW 706. The WTRU 704 may establish the second PDN connection 718 without deactivating the first PDN connection 712. For example, the message 720 may be sent by the MME 702 when the WTRU 704 moves to a different HeNB or macro cell. The WTRU 704 may perform a PDN connectivity request. The MME 702 may provide the IP address of the second P-GW 706 to the S-GW 708. The WTRU 704 may move one or more flows from the first PDN connection 712 to the second PDN connection 718. The WTRU 704 may stop transmitting on the first PDN connection 712.

As shown in FIG. 8, The WTRU 704 may deactivate the first PDN connection 712 when the WTRU 704 has completed moving one or more flows (e.g., all the existing flows) to the second PDN connection 718 and/or when no information (e.g., data) has been received via the first PDN connection 712 after a predetermined duration.

A SIPTO bearer context may be transferred between MMEs when the WTRU performs TAU from idle mode. Transfer of the SIPTO bearer context may be performed via an indication that may identify the SIPTO bearer. The indication may be used by a target LGW to perform APN-AMBR policing, as described herein.

In an example EPS architecture, for the same APN there may be a P-GW (e.g., only one P-GW). The P-GW may enforce APN-AMBR. An APN may have two P-GWs, which may make APN-AMBR policing difficult.

For SIPTO above RAN, the S-GW 708 may perform APN-AMBR monitoring. The S-GW 708 may know the APN-AMBR and information relating to which bearer or bearers belong to the APN.

For SIPTO@LN, APN-AMBR monitoring may be located at a LGW (e.g., either collocated with SGW or eNB). The LGW may already perform APN-AMBR monitoring of a first PDN connection 712. A first APN-AMBR of the first PDN connection 712 may be summed with a secondAPN-AMBR of a second (e.g., a new) PDN connection 718. The LGW may meter the second PDN connection 718. The sum of the first APN-AMBR and the second APN-AMBR may be policed.

For a collocated LGW with an eNB, the eNB may not know which bearer belongs to the first SIPTO PDN connection 712. The MME 702 may signal this bearer identity to a target eNB.

The MME 702 may separate the APN-AMBR into components that may be designated, for example, as a first APN-AMBR and a second APN-AMBR. For example, APN-AMBR=the first APN-AMBR+the second APN-AMBR. The MME 702 may receive subscription data. The subscription data may include the APN-AMBR. The MME 702 may determine a modified first APN-AMBR. The MME 702 may modify the APN-AMBR to the first APN-AMBR for the first PDN connection 712 (e.g., before the WTRU 704 performs a PDN connectivity request). The MME 702 may signal the modified first APN-AMBR to an eNodeB. The MME 702 may send a modified bearer command to a s S-GW 708. The modified bearer command may identify the modified first APN-AMBR. The MME 702 may modify the second APN-AMBR-to APN-AMBR for the second PDN connection 718 (e.g., after the WTRU 704 deactivates the second PDN connection 718).

The processes and instrumentalities described herein may apply in any combination, may apply to other wireless technology, and for other services.

A WTRU may refer to an identity of the physical device, or to the user's identity such as subscription related identities, e.g., MSISDN, SIP URI, etc. WTRU may refer to application-based identities, e.g., user names that may be used per application.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as CD-ROM disks, and/or digital versatile disks (DVDs). A processor in association with software may be used to implement a radio frequency transceiver for use in a WTRU, UE, terminal, base station, RNC, and/or any host computer.

What is claimed is:

1. A method implemented by a wireless transmit/receive unit (WTRU), the method comprising:
    determining, by the WTRU, preference information associated with an application of the WTRU;
    sending, by the WTRU, a first message including the determined preference information that indicates, for a flow associated with the application, that a deactivation of a first session associated with a first anchor point is after an establishment of a second session associated with a second anchor point;
    communicating, by the WTRU, data associated with the flow via the first anchor point using the first session associated with a first IP address;
    receiving, by the WTRU, a second message triggering the establishment of the second session and a movement of the flow to the second session;
    establishing, by the WTRU, the second session associated with the second anchor point;
    moving, by the WTRU, the flow from the first session that is associated with the first IP address to the second session that is associated with a second IP address; and
    after the moving of the flow to the second session, communicating, by the WTRU, data associated with the flow via the second anchor point using the second session associated with the second IP address.

2. The method of claim 1, wherein the first anchor point corresponds to a first gateway and the second anchor point corresponds to a second, different gateway.

3. The method of claim 1, further comprising, after the moving of the flow to the second session, deactivating the first session.

4. The method of claim 1, wherein the first session is associated with a first packet data network (PDN) connection and the second session is associated with a second PDN connection.

5. The method of claim 1, wherein the first session corresponds to an IP multimedia subsystem (IMS) session.

6. The method of claim 1, further comprising:
    receiving, by the WTRU, information indicating one or more policies associated with the application of the WTRU; and
    determining, based on the one or more indicated policies, whether to seamlessly move the flow to the second session prior to the deactivation of the first session.

7. The method of claim 1, wherein the first message is a non-access stratum message and the preference information is an information element (IE) of the non-access stratum (NAS) message.

8. A wireless transmit/receive unit (WTRU), comprising:
    a processor configured to determine preference information associated with an application of the WTRU; and
    a transmitter/receiver configured to:
        send a first message including the determined preference information that indicates, for a flow associated with the application, that a deactivation of a first session associated with a first anchor point is after an establishment of a second session associated with a second anchor point,
        communicate data associated with the flow via the first anchor point using the first session associated with a first IP address, and
        receive a second message to trigger the establishment of the second session and a movement of the flow to the second session,
    wherein:
        the processor is configured to:
            establish the second session associated with the second anchor point,
            move the flow from the first session associated with the first IP address to the second session associated with the second IP address, and the transmitter/receiver is configured to:
            after the movement of the flow to the second session, communicate data associated with the flow via the second anchor point using the second session associated with the second IP address.

9. The WTRU of claim 8, wherein the first anchor point corresponds to a first gateway and the second anchor point corresponds to a second, different gateway.

10. The WTRU of claim 8, further comprising, after the movement of the flow to the second session, the processor is configured to deactivate the first session.

11. The WTRU of claim 8, wherein the first session is associated with a first packet data network (PDN) connection and the second session is associated with a second PDN connection.

12. The WTRU of claim 8, wherein the first session corresponds to an IP multimedia subsystem (IMS) session.

13. The WTRU of claim 8, wherein the first message is a non-access stratum (NAS) message and the preference information is an information element (IE) of the non-access stratum (NAS) message.

14. The WTRU of claim 8, wherein:
- the transmitter/receiver is configured to receive information indicating one or more policies associated with the application of the WTRU; and
- the processor is configured to determine, based on the one or more indicated policies, whether to seamlessly move the flow to the second session prior to the deactivation of the first session.

\* \* \* \* \*

UNITED STATES PATENT AND TRADEMARK OFFICE
CERTIFICATE OF CORRECTION

PATENT NO. : 10,924,974 B2
APPLICATION NO. : 16/859047
DATED : February 16, 2021
INVENTOR(S) : Saad Ahmad and Li-Hsiang Sun Page 1 of 1

It is certified that error appears in the above-identified patent and that said Letters Patent is hereby corrected as shown below:

In the Specification

At Column 1, Line 12: replace "2062016," with --2016,--
At Column 1, Line 42: replace "(WTRUSs)" with --(WTRUs)--
At Column 1, Line 61: replace "e.g." with --e.g.,--
At Column 5, Line 11: replace "1x," with --1X,--
At Column 8, Line 13: replace "lub" with --Iub--
At Column 8, Line 15: replace "lur" with --Iur--
At Column 9, Line 26: replace "Si" with --S1--
At Column 12, Line 31: replace "the an" with --the--
At Column 19, Lines 2-3: replace "secondAPN-AMBR" with --second APN-AMBR--

Signed and Sealed this
Second Day of July, 2024

Katherine Kelly Vidal
*Director of the United States Patent and Trademark Office*